(Model.)

J. B. WEST.
EMBROIDERY HOLDER.

No. 299,943. Patented June 3, 1884.

Attest.
P. A. Levitich
E. P. Follett

Inventor.
J. B. West
pr R. F. Osgood,
atty.

UNITED STATES PATENT OFFICE.

REISSUED

JONATHAN B. WEST, OF ROCHESTER, NEW YORK.

EMBROIDERY-HOLDER.

SPECIFICATION forming part of Letters Patent No. 299,943, dated June 3, 1884.

Application filed October 22, 1883. (Model.)

*To all whom it may concern:*

Be it known that I, JONATHAN B. WEST, of Rochester, Monroe county, New York, have invented a certain new and useful Improvement in Embroidery-Holders; and I do hereby declare that the following is a full, clear, and exact description of the same, reference being had to the accompanying drawings, in which—

Figure 1:
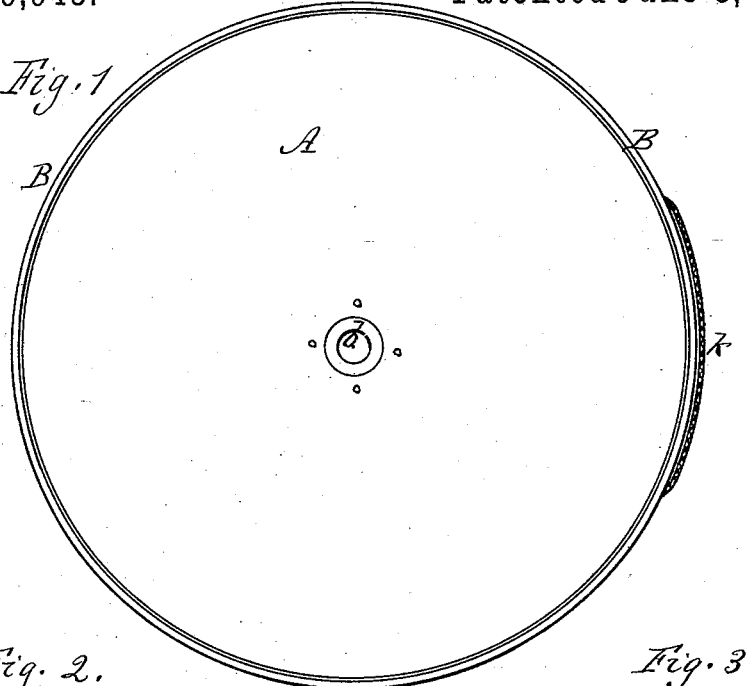
Figure 2:
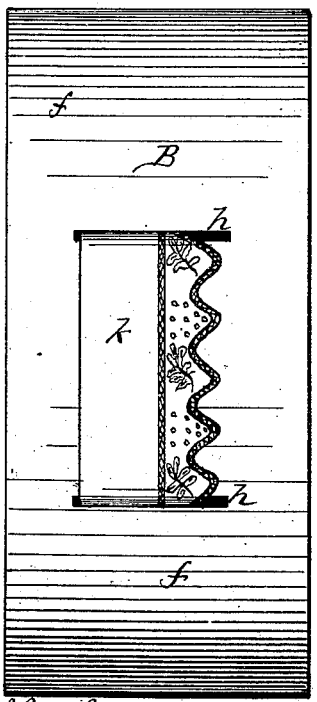
Figure 4:
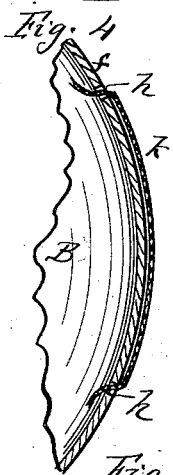
Figure 3:
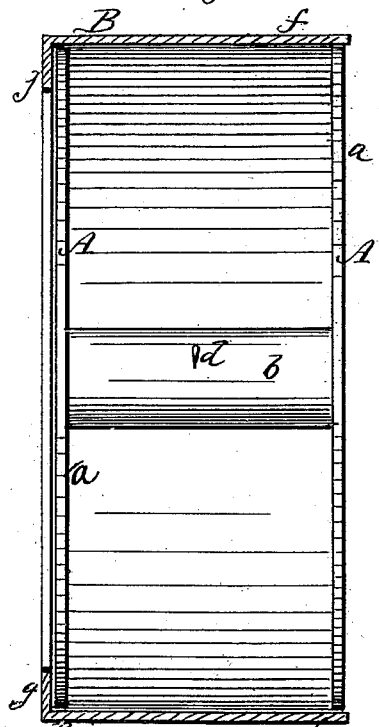
Figure 5:
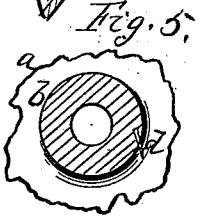

Figure 1 is a front elevation of the device. Fig. 2 is an edge elevation. Fig. 3 is a cross-section. Fig. 4 is a diagram showing a section of one edge of the box and the means for exhibiting the embroidery. Fig. 5 is a cross-section through the hub of the spool.

Embroideries—such as Hamburg edgings, &c.—are worked in lines or rows on a sheet of cloth, and are rolled in that form. The purchaser must cut the sheet into strips and then notch or trim the edges. I have invented means for slitting the sheet, also for notching or trimming the edges of the embroidery, and it is designed, after the embroidery is prepared in this way, and is ready for use, to wind the strips upon a spool like ribbons and tapes, and to keep it in store in that form.

My present invention consists in the combination, with a two-headed spool, of an inclosing cylindrical box provided with a flange at one end, and with slots in the rim through which a portion of the embroidery may be exposed to view, the spool fitting into and forming the heads of the box, whereby the spool can be inserted bodily into the box and the end of the embroidery be still exhibited at all times, as hereinafter set forth.

In the drawings, A shows the spool, and B the inclosing box or receptacle.

The spool is of ordinary form, consisting of two heads, *a a*, and a central hub, *b*, the latter being preferably hollow, and provided with a projecting point or pin, *d*, upon which the end of the embroidery is caught to wind it upon the spool. The embroidery is wound upon the spool between the two heads.

The box B is of circular or hoop form, as shown, consisting of the rim *f* and a right-angled flange, *g*, at the back, which acts as a stop to the spool. The front of the box is left entirely open to allow the spool to be inserted bodily therein and to form the heads of the box. In the rim of the box are made two slots, *h h*, standing crosswise, or, if desired, a long rectangular opening may be used, and the loose end *k* of the embroidery is passed through and remains at all times in sight as a sample. The outer head of the spool, when inserted in the box, forms the head of the box, which then presents the appearance of an ordinary circular box with both ends closed, the end of the embroidery resting on the exterior surface of the rim. The loose end of the embroidery passes out through the upper slot, and is tucked into the lower one, so that a smooth surface is presented.

The spool combined with the box, as above described, is in convenient form for transportation and storage, as the goods can be wound up and inclosed, so as not to be exposed or to unwind. At the same time the end of the embroidery is exposed as a sample, and, if desired, the spool can be placed upon a pin or axis and the embroidery be unwound for sale without removing the box from the spool. In hand use the box serves as a hand-hold, the spool turning easily within it. Other goods— such as ribbons, tapes, &c.—may be prepared in the same way, and the same kind of spool be used.

I disclaim a box made of two sections, with a central core attached to one of the sections, which can be turned to wind up the fabric. I also disclaim a roller which turns between two fixed heads.

What I claim as new is—

In an embroidery-holder, the combination, with a two-headed spool, A, of an inclosing cylindrical box, B, provided with a flange, *g*, at one end, and with slots *h h* in the rim, through which a portion of the embroidery may be exposed to view, the spool fitting into and forming the heads of the box, substantially as and for the purpose herein specified.

In witness whereof I have hereunto signed my name in the presence of two subscribing witnesses.

JONATHAN B. WEST.

Witnesses:
R. F. OSGOOD,
P. A. COSTICH.